United States Patent
Needham (10) Patent No.: US 10,106,318 B2
(45) Date of Patent: Oct. 23, 2018

(54) MULTI-PURPOSE PLASTIC BAG HOLDER FOR USE WITH A RETRACTABLE DOG LEASH AND IN OTHER SCALABLE WASTE CONTAINMENT CONFIGURATIONS

(71) Applicant: Bob Needham, Chattanooga, TN (US)

(72) Inventor: Bob Needham, Chattanooga, TN (US)

( * ) Notice: Subject to any disclaimer, the term of this patent is extended or adjusted under 35 U.S.C. 154(b) by 0 days.

(21) Appl. No.: 15/800,232

(22) Filed: Nov. 1, 2017

(65) Prior Publication Data
US 2018/0118456 A1 May 3, 2018

Related U.S. Application Data

(60) Provisional application No. 62/416,921, filed on Nov. 3, 2016.

(51) Int. Cl.
| | | |
|---|---|---|
| B65F 1/00 | (2006.01) | |
| A45C 13/10 | (2006.01) | |
| A01K 27/00 | (2006.01) | |
| B65F 1/14 | (2006.01) | |
| E01H 1/12 | (2006.01) | |

(52) U.S. Cl.
CPC .......... *B65F 1/002* (2013.01); *A01K 27/008* (2013.01); *A45C 13/10* (2013.01); *B65F 1/1415* (2013.01); *A45C 2013/1015* (2013.01); *B65F 2240/136* (2013.01); *E01H 2001/1273* (2013.01); *E01H 2001/1286* (2013.01)

(58) Field of Classification Search
CPC ....... A47F 9/042; A47F 13/085; G07F 11/045
USPC .......... 221/1, 46, 197, 45; 211/59.1; D6/515
See application file for complete search history.

(56) References Cited

U.S. PATENT DOCUMENTS

| | | | | |
|---|---|---|---|---|
| 5,042,687 | A * | 8/1991 | McKinley | A47F 1/08 221/155 |
| D327,014 | S * | 6/1992 | Heller | D9/415 |
| 5,176,286 | A * | 1/1993 | Snowdon | A47F 5/0043 221/283 |
| 5,570,808 | A * | 11/1996 | Tassoni | A47F 1/08 221/311 |
| 6,062,424 | A * | 5/2000 | Simile-Gravina | A47F 1/08 206/746 |
| 6,557,723 | B2 * | 5/2003 | Chen | A47F 13/085 206/554 |
| 7,073,462 | B1 * | 7/2006 | Layman | A01K 27/006 119/161 |
| D547,580 | S * | 7/2007 | Wilfong, Jr. | D6/515 |
| 7,624,881 | B2 * | 12/2009 | Wilfong, Jr. | B65D 83/08 211/59.1 |
| 7,717,293 | B2 * | 5/2010 | Bellafatto | A47F 13/085 221/312 C |

(Continued)

*Primary Examiner* — Gene O Crawford
*Assistant Examiner* — Ayodeji T Ojofeitimi
(74) *Attorney, Agent, or Firm* — Chambliss, Bahner & Stophel, P.C.

(57) ABSTRACT

A bag dispenser having a housing adapted to receive plastic bags. The housing has a front end, a back end that is spaced apart from the front end, a top side, a bottom side that is spaced apart from the top side, a left side, a right side that is spaced apart from the left side, a front opening that is disposed at the front end, and a pair of back openings that are disposed at the back end. The housing defines an interior space adapted to removably hold the plastic bags. The bag dispenser also comprises a means for attaching the housing to another object. A method for removably holding plastic bags in a bag dispenser.

12 Claims, 10 Drawing Sheets

(56) References Cited

U.S. PATENT DOCUMENTS 8,256,644 B2 * 9/2012 Orgna ................. A47K 5/1202
                                                                                 221/45
2012/0118905 A1 * 5/2012 Lindbergh ........... A47K 10/421
                                                                                 221/1

* cited by examiner

MULTI-PURPOSE PLASTIC BAG HOLDER FOR USE WITH A RETRACTABLE DOG LEASH AND IN OTHER SCALABLE WASTE CONTAINMENT CONFIGURATIONS

CROSS-REFERENCES TO RELATED APPLICATIONS/PATENTS

This application relates back to and claims the benefit of priority from U.S. Provisional Application for Patent Ser. No. 62/416,921 titled "Multiple-Purpose Reusable Plastic Bag Holder for Use with a Retractable Dog Leash and in Other Scalable Waste Containment Configurations" and filed on Nov. 3, 2016.

FIELD OF THE INVENTION

The present invention relates generally to a versatile apparatus and method for holding bags, and particularly an apparatus and method for holding reusable plastic bags used to retrieve solid animal waste such as that of a dog.

BACKGROUND AND DESCRIPTION OF THE PRIOR ART

Many pet owners utilize leash devices while walking their pets. Municipal laws and community standards often times require pet owners to collect and discard of any solid waste or refuse that the pet may deposit during a walk, and thus it is generally necessary for pet owners to carry waste bags with them when walking their leashed pets. Devices that combine a pet leash with means for holding waste bags are known, but those devices presently known in the art have numerous deficiencies, such as requiring specialized bags.

For instance, U.S. Patent Application Publication No. 2012/0006284 discloses a retractable pet leash that includes a bag container integrated into a side panel of the leash housing. This bag container, being integral to the pet leash as a whole, is not readily separable from the leash; therefore there is no option to use the pet leash without the bag container.

It would be desirable, therefore, if a device could be provided that would hold bags and that can be attached to an existing retractable pet leash. It would also be desirable if such a device or apparatus could be provided that would be easy to clean. It would be still further desirable if such a device or apparatus could be provided that would not need to be replaced with the pet leash if the pet leash suffers a structural or mechanical failure. It would be still further desirable if such a device or apparatus could be provided that is dimensioned to accept and work with many different types of reusable plastic bags.

Advantages of the Preferred Embodiments of the Invention

Accordingly, it is an advantage of the preferred embodiments of the invention claimed herein to provide an apparatus for holding multiple reusable plastic waste bags that can be attached to any pet leash with dimensions compatible with the means of attachment, thereby making it unnecessary for a pet owner to purchase a pet leash that has in integrated bag container. It is also an advantage of the preferred embodiments of the invention claimed herein to provide an apparatus that is dimensioned to accept and work with many different types of bags, including, e.g., plastic shopping bags, thereby making it unnecessary for a pet owner to purchase special bags. It is a further advantage of the preferred embodiments of the invention claimed herein to provide an apparatus that does not need to be replaced with the pet leash if the pet leash suffers a structural or mechanical failure. It is another advantage of the preferred embodiments of the invention claimed herein to provide an apparatus that is easy to clean. It is another advantage of the preferred embodiments of the invention claimed herein to provide an apparatus that generally loads and unloads from a side opening, leaving a front panel free for personalization or for logos.

Additional advantages of the preferred embodiments of the invention will become apparent from an examination of the drawings and the ensuing description.

SUMMARY OF THE INVENTION

The apparatus of the invention comprises a bag dispenser for removably holding plastic bags. The preferred bag dispenser comprises a housing adapted to receive plastic bags. The preferred housing comprises a front end, a back end that is spaced apart from the front end, a top side, a bottom side that is spaced apart from the top side, a left side, a right side that is spaced apart from the left side, a front opening that is disposed at the front end, and a pair of back openings that are disposed at the back end. The preferred bag dispenser also comprises a means for attaching the housing to another object. In the preferred embodiments of the bag dispenser, the housing defines an interior space adapted to removably hold the plastic bags.

The method of the invention comprises a method for removably holding plastic bags. The preferred method comprises providing a bag dispenser. The preferred bag dispenser comprises a housing adapted to receive plastic bags. The preferred housing comprises a front end, a back end that is spaced apart from the front end, a top side, a bottom side that is spaced apart from the top side, a left side, a right side that is spaced apart from the left side, a front opening that is disposed at the front end, and a pair of back openings that are disposed at the back end. The preferred bag dispenser also comprises a means for attaching the housing to another object. In the preferred embodiments of the bag dispenser, the housing defines an interior space adapted to removably hold the plastic bags. The preferred method further comprises removably holding the plastic bags in the bag dispenser.

BRIEF DESCRIPTION OF THE DRAWINGS

The presently preferred embodiments of the invention are illustrated in the accompanying drawings, in which like reference numerals represent like parts throughout, and in which.

DESCRIPTION OF THE PREFERRED EMBODIMENTS OF THE INVENTION

Referring now to the drawings, the preferred embodiments of the bag dispenser in accordance with the present invention are illustrated by FIGS. 1 through 16. As shown in FIGS. 1-16, the preferred bag dispensers are adapted to removably hold plastic bags and be removably attached to a pet leash. In addition, the preferred bag dispensers are easy to clean.

Figure 1:
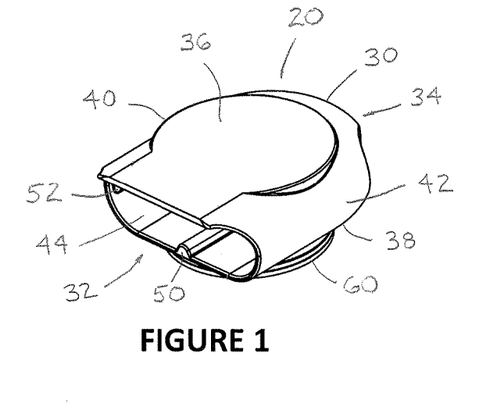
FIG. 1 is a front top perspective view of the preferred embodiment of the bag dispenser in accordance with the present invention.

Referring now to FIG. 1, a front perspective view of the preferred embodiment of the bag dispenser in accordance with the present invention is illustrated. As shown in FIG. 1, the preferred bag dispenser is designated generally by reference numeral 20. Preferred bag dispenser 20 comprises housing 30 which is adapted to receive plastic bags. Preferred housing 30 comprises front end 32, back end 34 which is spaced apart from the front end, top side 36, bottom side 38 which is spaced apart from the top side, left side 40, right side 42 which is spaced apart from the left side, and front opening 44 which is disposed at the front end. Preferred housing 30 also defines an interior space adapted to removably hold the plastic bags and comprises a polymer material.

Still referring to FIG. 1, preferred top side 36 and preferred bottom side 38 are substantially flat and the top side is longer than the bottom side. Preferred bottom side 38 comprises bottom side protuberance 50 and preferred left side 40 comprises left side protuberance 52. Preferred bag dispenser 20 further comprises a means for attaching the housing to another object such as a pet leash. Preferred means for attaching the housing to another object comprises hook and loop fastener 60, however, it is contemplated within the scope of the invention that any suitable means for attaching the housing to another object such as a threaded fastener, an adhesive, a magnet, any combination thereof, and the like may be used. While FIG. 1 illustrates the preferred configuration and arrangement of bag dispenser 20, it is contemplated within the scope of the invention that the bag dispenser may be of any suitable configuration and arrangement.

Figure 2:
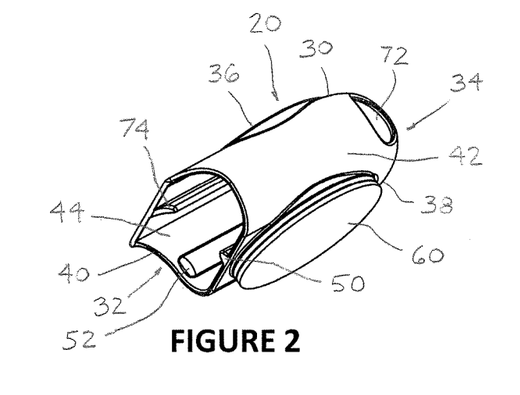
FIG. 2 is a front bottom perspective view of the preferred bag dispenser illustrated in FIG. 1.

Referring now to FIG. 2, a front bottom perspective view of preferred bag dispenser 20 is illustrated. As shown in FIG. 2, preferred bag dispenser 20 comprises housing 30 having front end 32, back end 34, top side 36, bottom side 38, left side 40, right side 42, front opening 44, bottom side protuberance 50, left side protuberance 52, hook and loop fastener 60, back opening 72, and top side protuberance 74.

Figure 3:
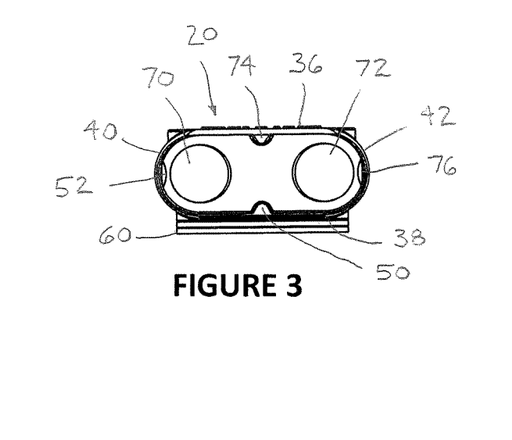
FIG. 3 is a front view of the preferred bag dispenser illustrated in FIGS. 1-2.

Referring now to FIG. 3, a front view of preferred bag dispenser 20 is illustrated. As shown in FIG. 3, preferred bag dispenser 20 comprises top side 36, bottom side 38, left side 40, right side 42, bottom protuberance 50, and left side protuberance 52. In addition, preferred bag dispenser 20 comprises hook and loop fastener 60. As also shown in FIG. 2, preferred bag dispenser 20 further comprises a pair of back openings 70 and 72 which are disposed at the back end, top side protuberance 74, and right side protuberance 76. It is also contemplated within the scope of the invention that preferred bag dispenser 20 may comprise a single back opening or more than two back openings and/or no protuberances.

Figure 4:
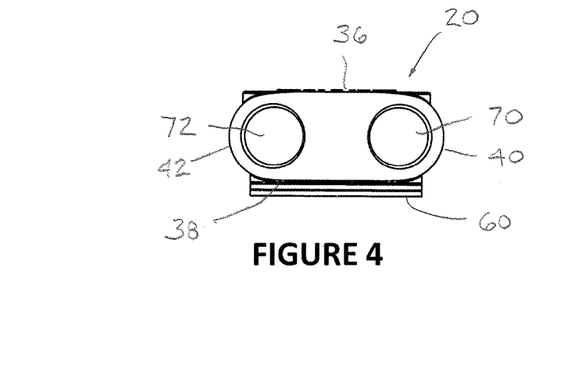
FIG. 4 is a back view of the preferred bag dispenser illustrated in FIGS. 1-3.

Referring now to FIG. 4, a back view of preferred bag dispenser 20 is illustrated. As shown in FIG. 4, preferred bag dispenser 20 comprises top side 36, bottom side 38, left side 40, right side 42, hook and loop fastener 60, and back openings 70 and 72.

Figures 5, 6, 7:
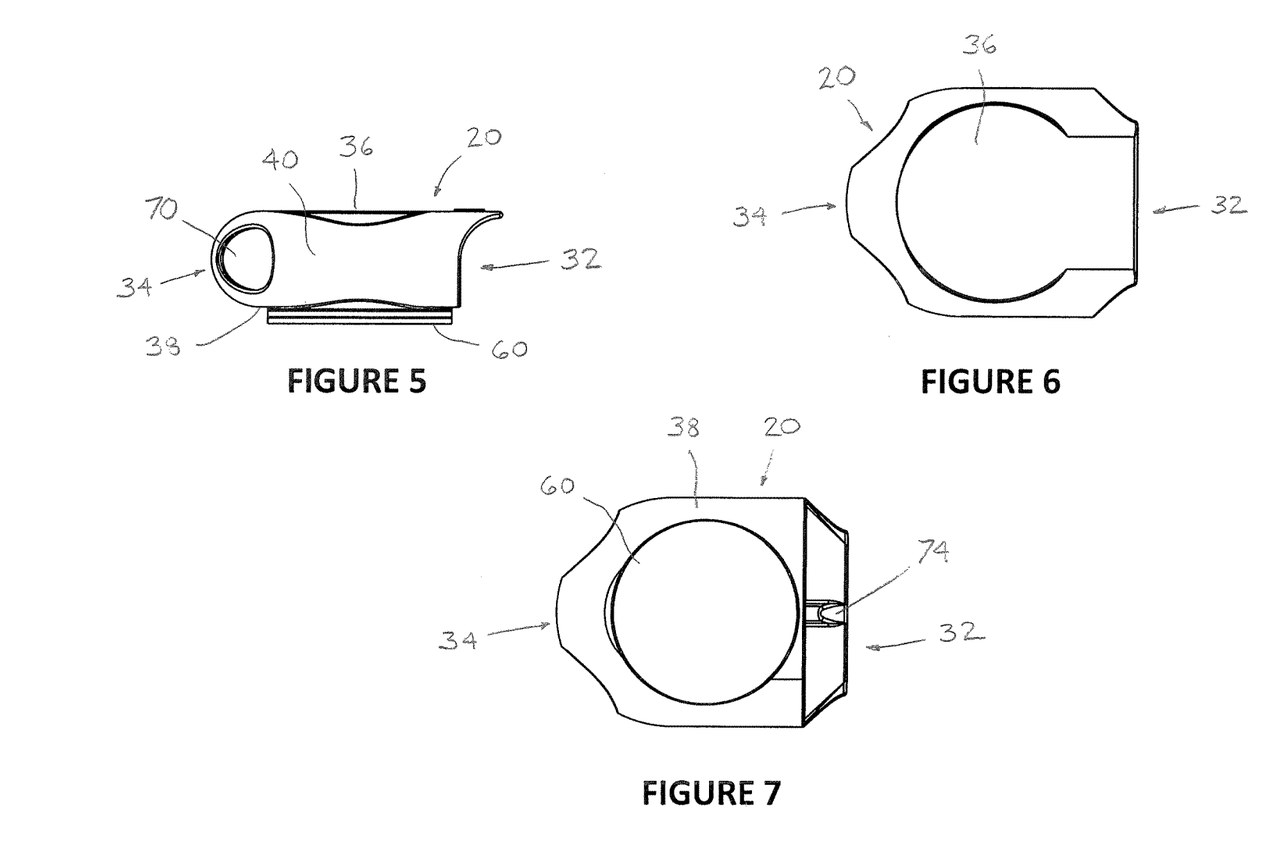
FIG. 5 is a left side view of the preferred bag dispenser illustrated in FIGS. 1-4.
FIG. 6 is a top view of the preferred bag dispenser illustrated in FIGS. 1-5.
FIG. 7 is a bottom view of the preferred bag dispenser illustrated in FIGS. 1-6.

Referring now to FIG. 5, a left side view of preferred bag dispenser 20 is illustrated. As shown in FIG. 5, preferred bag dispenser comprises front end 32, back end 34, top side 36, bottom side 38, left side 40, hook and loop fastener 60, and back opening 70.

Referring now to FIG. 6, a top view of preferred bag dispenser 20 is illustrated. As shown in FIG. 6, preferred bag dispenser 20 comprises front end 32, back end 34, and top side 36.

Referring now to FIG. 7, a bottom view of preferred bag dispenser 20 is illustrated. As shown in FIG. 7, preferred bag dispenser 20 comprises front end 32, back end 34, bottom side 38, hook and loop fastener 60, and top side protuberance 74.

Figure 8:
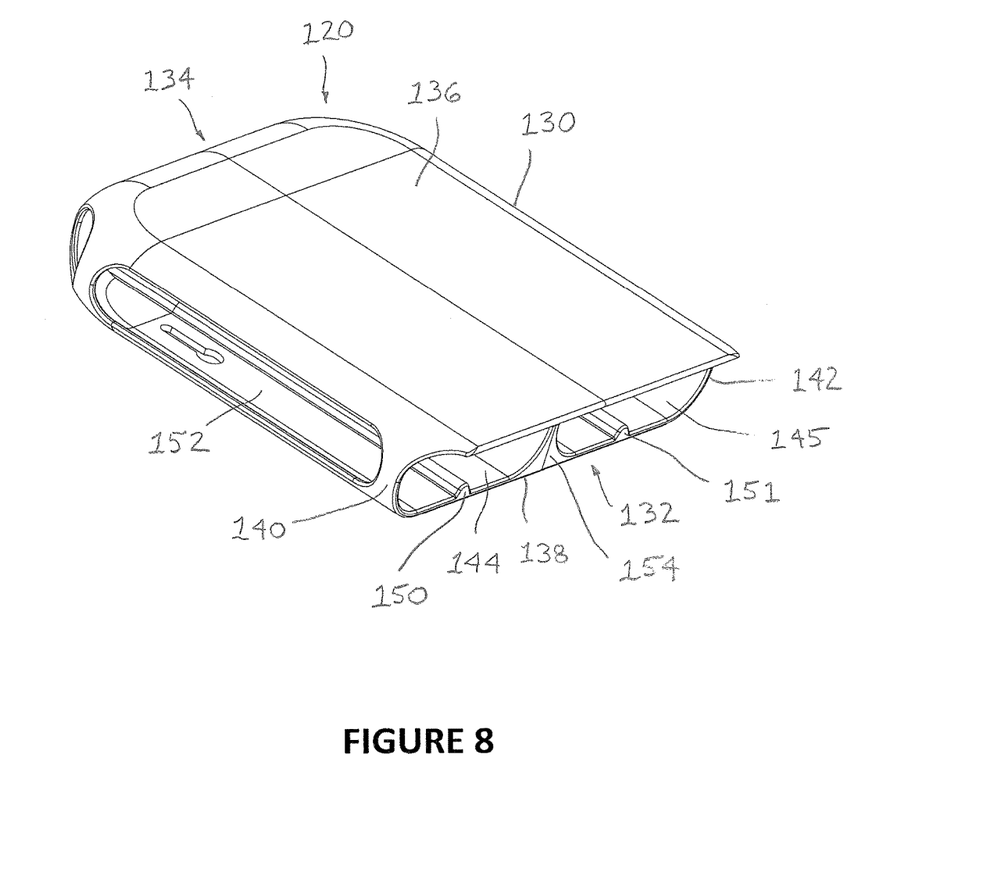
FIG. 8 is a front top perspective view of a first alternative embodiment of the preferred bag dispenser in accordance with the present invention.

Referring now to FIG. 8, a front top perspective view of a first alternative embodiment of the preferred bag dispenser in accordance with the present invention is illustrated. As shown in FIG. 8, the preferred bag dispenser is designated generally by reference numeral 120. Preferred bag dispenser 120 comprises housing 130 which is adapted to receive plastic bags. Preferred housing 130 comprises front end 132, back end 134 which is spaced apart from the front end, top side 136, bottom side 138 which is spaced apart from the top side, left side 140, right side 142 which is spaced apart from the left side, and a pair of front openings 144 and 145 which are disposed at the front end. Preferred housing 130 also comprises a polymer material.

Still referring to FIG. 8, preferred top side 136 and preferred bottom side 138 are substantially flat and the top side is longer than the bottom side. Preferred bottom side 138 comprises bottom side protuberances 150 and 151 and preferred left side 140 comprises left side opening 152. Preferred bag dispenser 120 further comprises barrier 154 which is spaced apart from the left side and the right side. Preferred housing 130 defines a left side interior space adapted to removably hold the plastic bags and a right side interior space adapted to removably hold the plastic bags. While FIG. 8 illustrates the preferred configuration and arrangement of bag dispenser 120, it is contemplated within the scope of the invention that the bag dispenser may be of any suitable configuration and arrangement.

Figure 9:
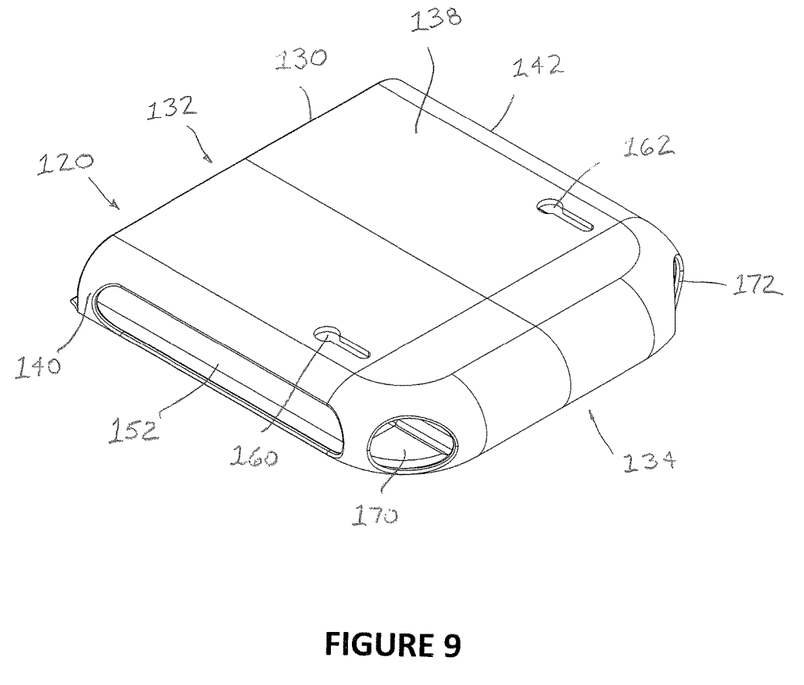
FIG. 9 is a back bottom perspective view of the preferred bag dispenser illustrated in FIG. 8.

Referring now to FIG. 9, a back bottom perspective view of preferred bag dispenser 120 is illustrated. As shown in FIG. 9, preferred bag dispenser 120 comprises housing 130, front end 132, back end 134, bottom side 138, left side 140, right side 142, left side opening 152, means for attaching the housing to another object such as bottom side openings 160 and 162, and a pair of back openings 170 and 172 which are disposed at the back end. It is contemplated within the scope of the invention that preferred bag dispenser 120 may have more than one left side opening or no left side opening and/or fewer or more than two bottom side openings.

Figure 10:
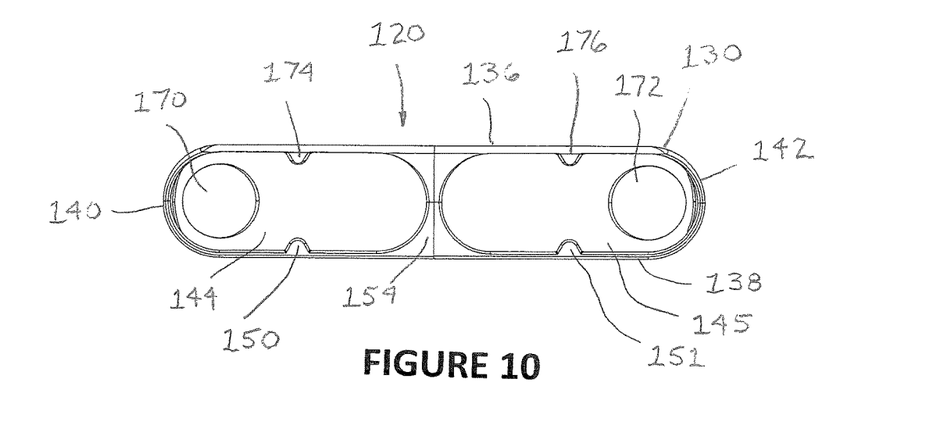
FIG. 10 is a front view of the preferred bag dispenser illustrated in FIGS. 8-9.

Referring now to FIG. 10, a front view of preferred bag dispenser 120 is illustrated. As shown in FIG. 10, preferred housing 130 comprises top side 136, bottom side 138, left side 140, right side 142, a pair of front openings 144 and 145, bottom side protuberances 150 and 151, barrier 154, a pair of back openings 170 and 172, and a pair of top protuberances 174 and 176. It is contemplated within the scope of the invention that preferred bag dispenser 120 may have fewer or more than four protuberances, fewer or more than one barrier, and/or fewer or more than two front openings.

Figure 11:
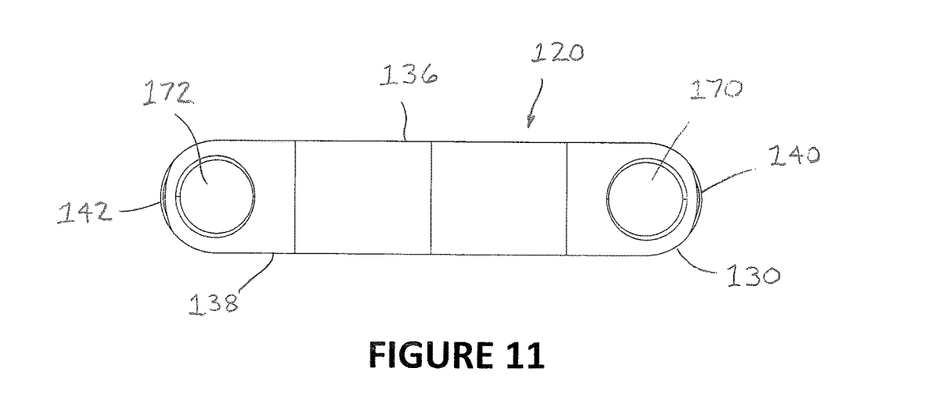
FIG. 11 is a back view of the preferred bag dispenser illustrated in FIGS. 8-10.

Referring now to FIG. 11, a back view of preferred bag dispenser 120 is illustrated. As shown in FIG. 11, preferred housing 130 comprises top side 136, bottom side 138, left side 140, right side 142, and a pair of back openings 170 and 172. It is contemplated within the scope of the invention that preferred bag dispenser 120 may have fewer or more than two back openings.

Figure 12:
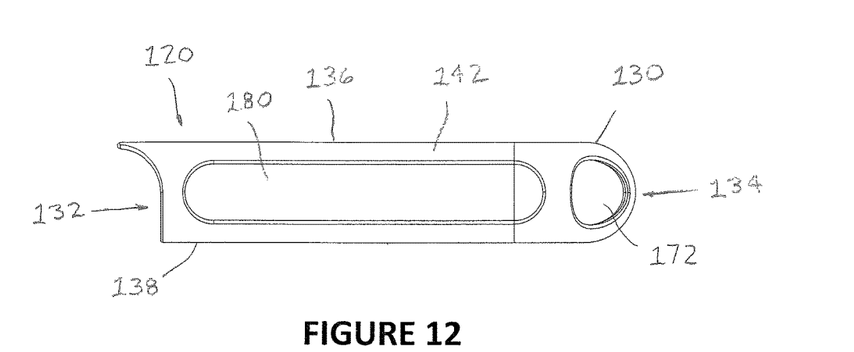
FIG. 12 is a right side view of the preferred bag dispenser illustrated in FIGS. 8-11.

Referring now to FIG. 12, a right side view of preferred bag dispenser 120 is illustrated. As shown in FIG. 12, preferred housing 130 comprises front end 132, back end 134, top side 136, bottom side 138, right side 142, back opening 172, and right side opening 180. It is contemplated within the scope of the invention that preferred bag dispenser 120 may have more than one right side opening or no right side opening.

Figure 13:
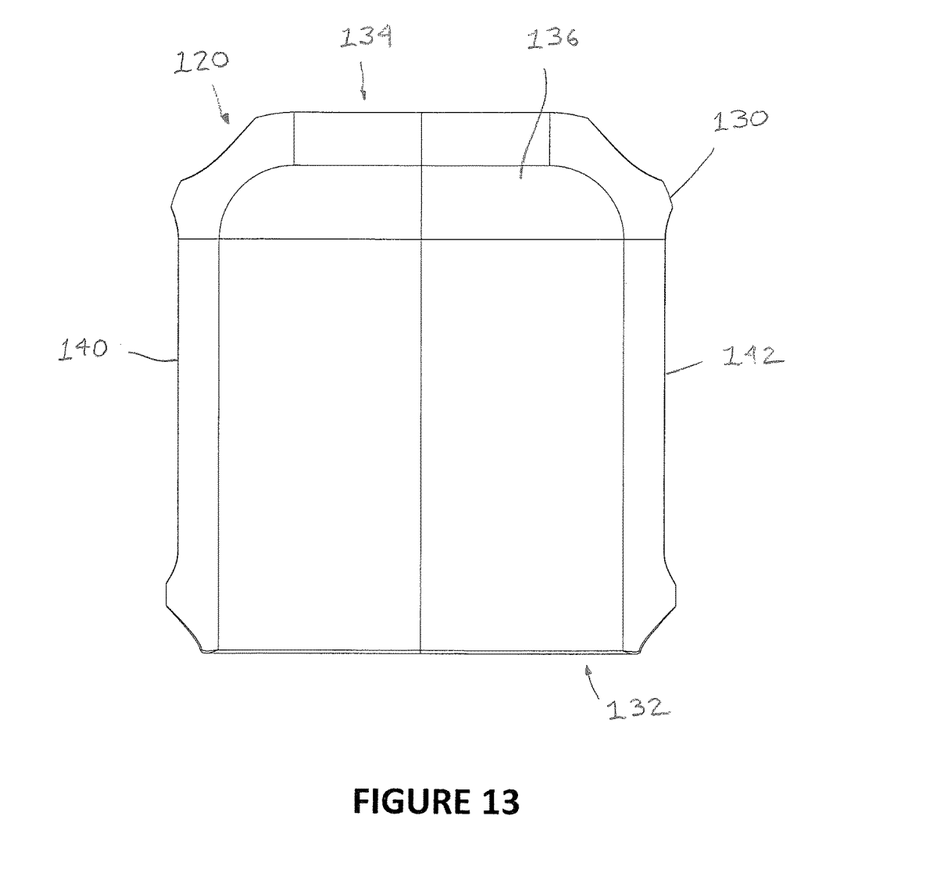
FIG. 13 is a top view of the preferred bag dispenser illustrated in FIGS. 8-12.

Referring now to FIG. 13, a top view of preferred bag dispenser 120 is illustrated. As shown in FIG. 13, preferred housing 130 comprises front end 132, back end 134, top side 136, left side 140, and right side 142.

Figure 14:
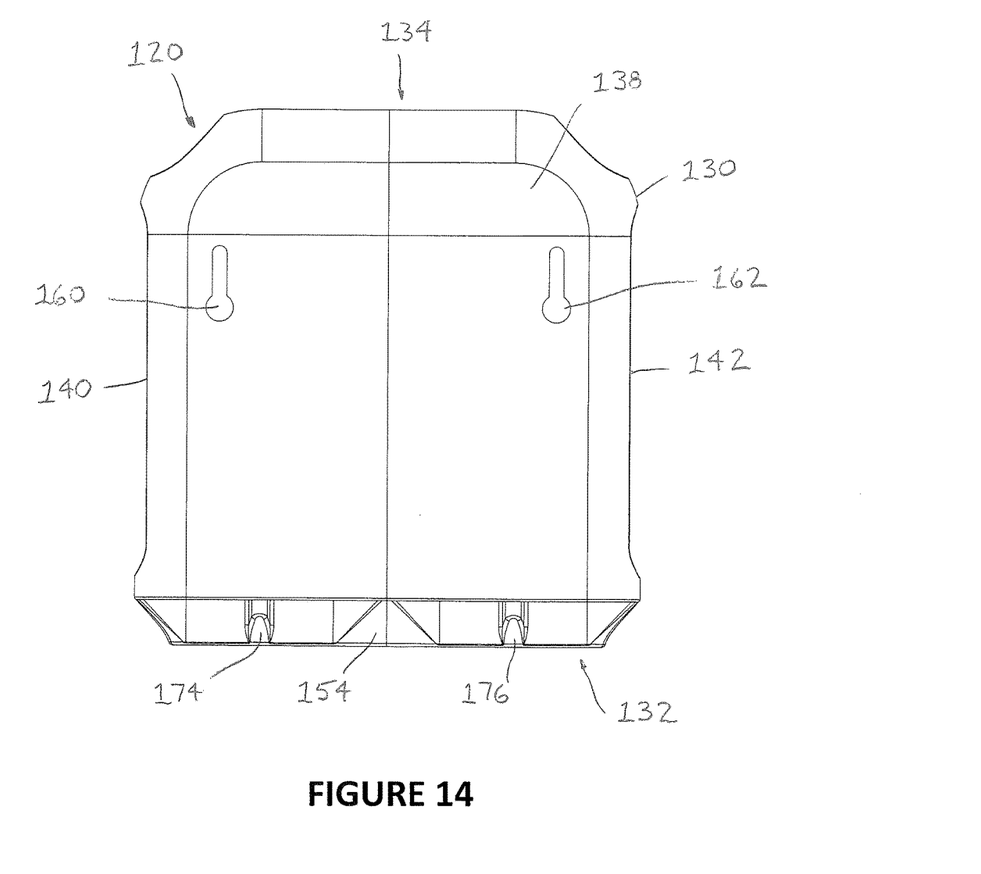
FIG. 14 is a bottom view of the preferred bag dispenser illustrated in FIGS. 8-13.

Referring now to FIG. 14, a bottom view of preferred bag dispenser 120 is illustrated. As shown in FIG. 14, preferred bag dispenser 120 comprises housing 130 having front end 132, back end 134, bottom side 138, left side 140, right side 142, barrier 154, bottom side openings 160 and 162, and a pair of top side protuberances 174 and 176.

Figure 15:
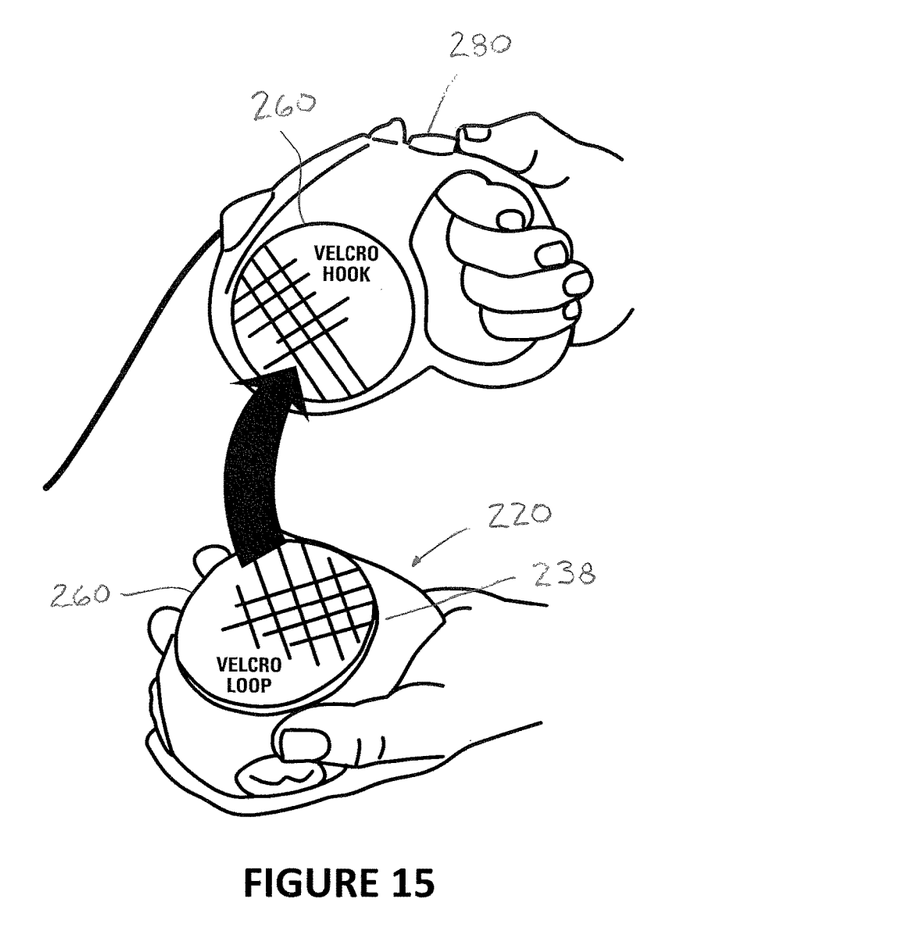
FIG. 15 is a perspective view of a second alternative embodiment of the bag dispenser in accordance with the present invention and an exemplary retractable dog leash.

Referring now to FIG. 15, a perspective view of a second alternative embodiment of the bag dispenser in accordance with the present invention and an exemplary retractable dog leash. As shown in FIG. 15, the preferred bag dispenser is designated generally by reference numeral 220. Half of hook and loop fastener 260 may be affixed to the bottom side 238 of housing 230 and the other half of hook and loop fastener 260 may be affixed to exemplary retractable dog leash 280.

Figure 16:
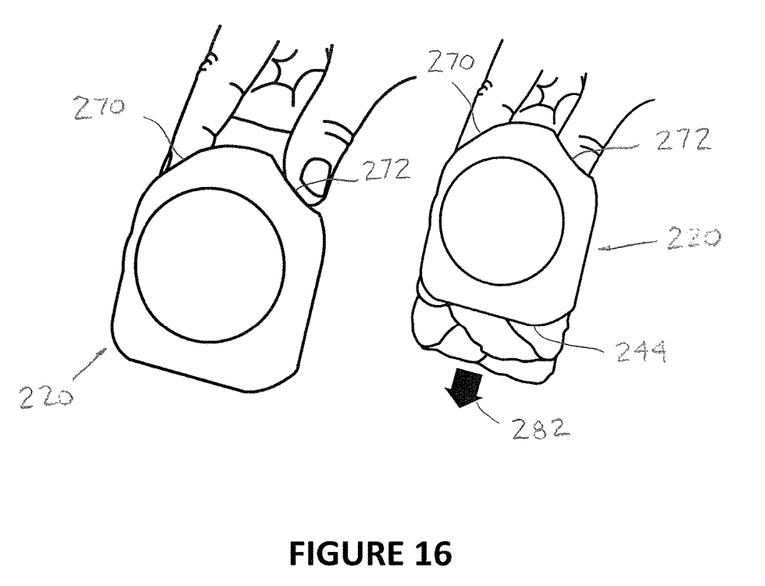
FIG. 16 is top view of the preferred bag dispenser illustrated in FIG. 15 showing how a plastic bag may be dispensed from the bag dispenser.

Referring now to FIG. 16, a top view of preferred bag dispenser 220 is illustrated showing how a plastic bag may be dispensed from the bag dispenser. More particularly, a pair of fingers are inserted into back openings 270 and 272 and push the plastic bag in the direction of arrow 282 through front opening 244.

The invention also comprises a method for removably holding plastic bags. The preferred method comprises providing a bag dispenser for holding plastic bags. The preferred bag dispenser comprises a housing adapted to receive plastic bags. The preferred housing comprises a front end, a back end that is spaced apart from the front end, a top side, a bottom side that is spaced apart from the top side, a left side, a right side that is spaced apart from the left side, a front opening that is disposed at the front end, a pair of back openings that are disposed at the back end. The preferred bag dispenser also comprises a means for attaching the housing to another object. In the preferred embodiments of the bag dispenser, the housing defines an interior space adapted to removably hold the plastic bags. The preferred method further comprises removably holding the plastic bags in the bag dispenser.

In operation, several advantages of the preferred embodiments of the bag dispenser are achieved. For example, the front opening is sized to enable the loading of plastic bags into the interior space and the extraction of plastic bags from the interior volume. The back and side openings permit access by a user's fingers into the interior space of the bag dispenser. The small openings allow a user to employ one or more fingers in pushing or otherwise facilitating the removal of plastic bags from the interior space. The preferred housing includes one or more protuberances which act as a retention feature, providing friction or pressure to hold plastic bags within the housing until a user acts to extract a bag. The preferred embodiments of the bag dispenser allow for the bag dispenser to be attached to a pet leash at will, generally by use of matching VELCRO® strips on the bag dispenser and the pet leash. The bag dispenser can be attached to any retractable pet leash with dimensions compatible with the means of attachment; it is therefore unnecessary for a pet owner to purchase a pet leash that has in integrated bag container. The bag dispenser may be removed from the pet leash when not in use with the pet leash, and may be attached to other objects or stored in other locations, e.g. on a refrigerator, in a closet, or on the wall of a garage. The removability of the bag dispenser also makes it easier to clean. Further, the bag dispenser does not need to be replaced with the pet leash if the pet leash suffers a structural or mechanical failure. The bag dispenser is dimensioned to accept and work with many different types of bags, including, e.g., plastic shopping bags. As a result, it is not necessary for a user to purchase special bags to go with the bag container. The bag dispenser of the present invention generally loads and unloads from a front end opening, thereby leaving the top side free for personalization or for logos, including, for example, sports team logos and company logos. Preferably, the bag dispenser is fabricated from a durable recycled polymer material or from a similar lightweight material and is recyclable and/or biodegradable.

Although this description contains many specifics, these should not be construed as limiting the scope of the invention but as merely providing illustrations of some of the presently preferred embodiments thereof, as well as the best mode contemplated by the inventors of carrying out the invention. The invention, as described herein, is susceptible to various modifications and adaptations, and the same are intended to be comprehended within the meaning and range of equivalents of the appended claims.

What is claimed is:

1. A bag dispenser for holding plastic bags, said bag dispenser comprising:
 (a) a housing adapted to receive plastic bags, said housing comprising:
  (1) a front end;
  (2) a back end, said back end being spaced apart from the front end;
  (3) a top side, said top side having a top side length;
  (4) a bottom side, said bottom side having a bottom side length and being spaced apart from the top side;
  (5) a left side, said left side having a left side length;
  (6) a right side, said right side having a right side length and being spaced apart from the left side;

(7) a front opening, said front opening being disposed at the front end;
(8) a pair of back openings, said pair of back openings being disposed at the back end;
(9) a protuberance;

(b) a means for attaching the housing to another object;

wherein the housing defines an interior space adapted to removably hold the plastic bags;

and wherein the protuberance extends substantially along at least one of the top side length, the bottom side length, the left side length, and the right side length and into the interior space of the housing.

2. The bag dispenser of claim 1 wherein said another object comprises a pet leash.

3. The bag dispenser of claim 1 wherein said means for attaching said housing to another object comprises hook-and-loop fasteners.

4. The bag dispenser of claim 1 wherein said housing comprises a polymer material.

5. The bag dispenser of claim 1 wherein the left side comprises a left side protuberance.

6. The bag older of claim 1 wherein the right side comprises a right side protuberance.

7. The bag dispenser of claim 1 wherein the top side comprises a top side protuberance.

8. The bag dispenser of claim 1 wherein the bottom side comprises a bottom side protuberance.

9. The bag dispenser of claim 1 wherein the top side is substantially flat.

10. The bag dispenser of claim 1 wherein the bottom side is substantially flat.

11. The bag dispenser of claim 1 wherein the top side is longer than the bottom side.

12. A method for removably holding plastic bags, said method comprising:

(a) providing a bag dispenser for holding plastic bags, said bag dispenser comprising:
(1) a housing adapted to receive plastic bags, said housing comprising:
(i) a front end;
(ii) a back end, said back end being spaced apart from the front end;
(iii) a top side, said top side having a top side length;
(iv) a bottom side, said bottom side having a bottom side length and being spaced apart from the top side;
(v) a left side, said left side having a left side length;
(vi) a right side, said right side having a right side length and being spaced apart from the left side;
(vii) a front opening, said front opening being disposed at the front end;
(viii) a pair of back openings, said pair of back openings being disposed at the back end;
(ix) a protuberance;
(2) a means for attaching the housing to another object;
wherein the housing defines an interior space adapted to removably hold the plastic bags; and wherein the protuberance extends substantially along at least one of the top side length, the bottom side length, the left side length, and the right side length and into the interior space of the housing;

(b) removably holding the plastic bags in the bag dispenser.

* * * * *